C. W. GRIFFIN.
LAWN EDGE TRIMMER.
APPLICATION FILED NOV. 17, 1920.
1,410,247.
Patented Mar. 21, 1922.
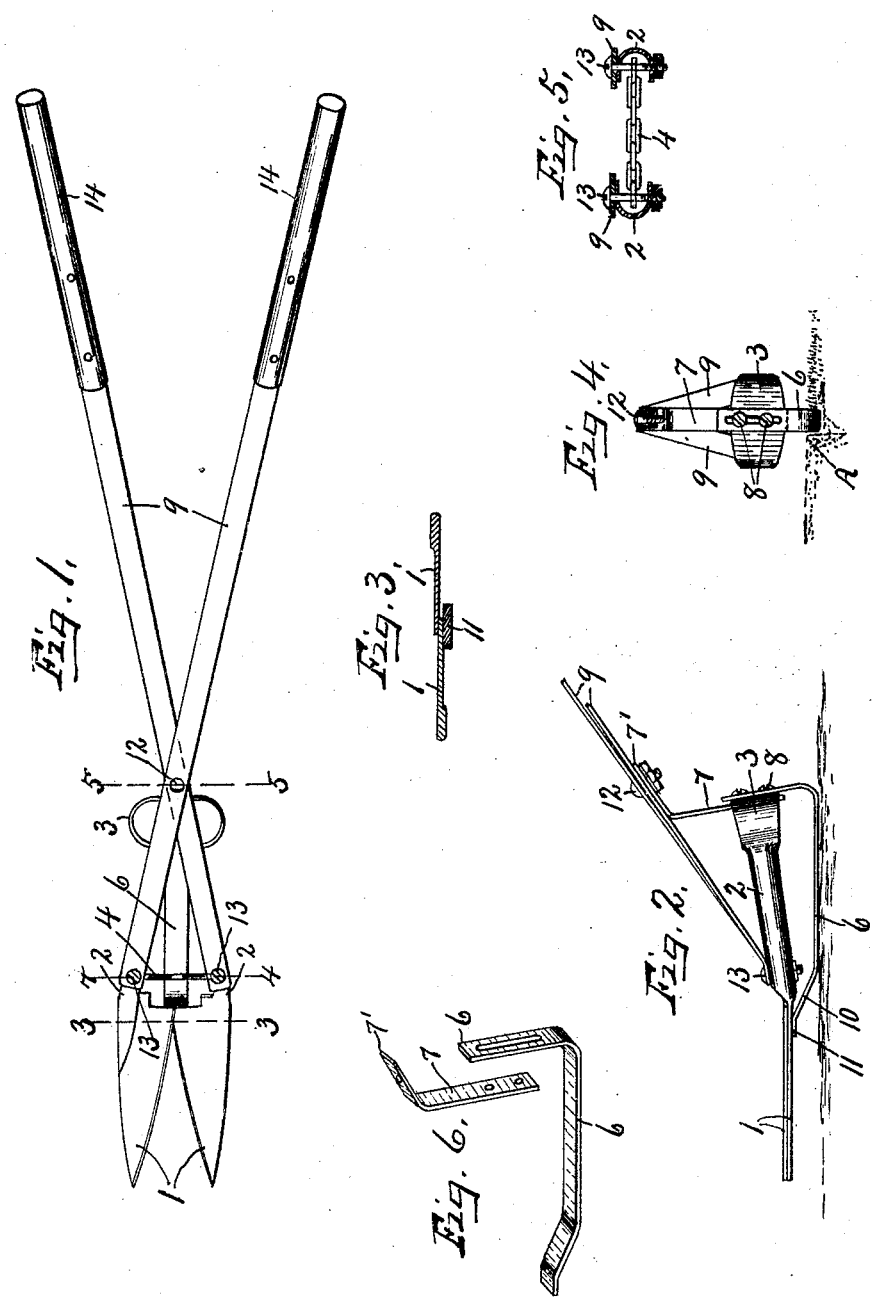

UNITED STATES PATENT OFFICE.

CLINTON W. GRIFFIN, OF UTICA, NEW YORK.

LAWN-EDGE TRIMMER.

1,410,247.	Specification of Letters Patent.	Patented Mar. 21, 1922.

Application filed November 17, 1920. Serial No. 424,588.

*To all whom it may concern:*

Be it known that I, CLINTON W. GRIFFIN, of Utica, in the county of Oneida, in the State of New York, have invented new and useful Improvements in Lawn-Edge Trimmers, of which the following, taken in connection with the accompanying drawings, is a full, clear, and exact description.

This invention relates to certain improvements in lawn trimmers, in which suitable shearing blades are secured at one end to a combined brace and guide shoe and are operated by crossing hand levers attached to their respective blades and pivoted at their crossing to the brace in such manner that the levers will be disposed in an upwardly and rearwardly inclined position, when the shoe and shearing blades are in a substantially horizontal operating position.

The main object is to provide a light, strong and durable article of manufacture of this type in which the guide shoe and brace are disposed in a substantially vertical plane along the longitudinal center of the shears so as to perform the double function of supporting the shears and guiding the same along a definite line as the device is propelled by hand.

One of the specific objects is to provide a substantially straight guide shoe running lengthwise of and beneath the handles of the shear blades and of relative narrow transverse width so that either edge may be used against the edge of a walk, curb, or other edge enclosure of a lawn for guiding the shears along said edge, as the device is propelled forwardly by hand simultaneously with the shearing operation of the blades, the same guide also serving to gauge the height of cut of the grass.

Another object is to incline the front end of the shoe upwardly and forwardly to enable it to ride more easily over the surface of the lawn and, at the same time, if desired, to utilize said front end of the shoe as a guide rest for the lower blade in such manner as to allow said blades to move freely relatively to the shoe in their shearing operation.

Other objects and uses will be brought out in the following description.

In the drawings, Figure 1 is a top plan of a lawn trimmer embodying the various features of my invention.

Figure 2 is a side elevation of the same device except that the upper portion of the hand levers are broken away.

Figures 3, 4 and 5 are transverse vertical sectional views taken on lines —3—3—, —4—4— and —5—5—, Figure 1.

Figure 6 is perspective view of a detached guide shoe and brace.

As illustrated, this device comprises a pair of shearing blades —1— having suitable handles —2— united at their rear ends by a bow spring —3— and, together with the blades, constituting what is commonly known as a "sheep shear", the spring —3— being tensioned to open the blades.

Suitable means is provided for limiting the opening movement of the blades to prevent their complete separation and to maintain a slight over-lap of the rear ends of their cutting edges, when full open, said means consisting in this instance of a flexible tie piece —4— extending transversely of and at the rear ends of the blades and having its ends attached to the handles —2— by bolts —13—.

A guide shoe or runner —6— extends lengthwise of and beneath the shears in a vertical plane substantially coincident with the longitudinal center of said shears or midway between the handles —2— and in line with the cutting edges of the blades —1—, said guide shoe or runner consisting of a comparatively thin bar of steel or equivalent material of relatively narrow transverse width and having its rear end deflected upwardly to join a brace —7—, which is secured by screws or bolts —8— to the central portion of the bow spring —3—, the upper end of the brace being deflected rearwardly to form a support for a pair of upwardly and rearwardly inclined hand levers —9—.

The front end of the guide shoe or runner —6— is deflected upwardly and forwardly at —10— and terminates in a substantially horizontal seat or rest —11—, which is parallel with the main body of the runner —6— and forms additional support for the blades —1— near their junctions with the handles —2—, if desired.

The upwardly inclined portion —10— enables the shoe to ride easily over more or less uneven surfaces, as the device is propelled forwardly by hand. The lower blade —1— rests loosely upon the upper surface of the rest —11— on the forward end of the runner —6— and is movable transversely thereon as the blades are operated in the act of cutting the grass, it being understood that the upper blade is tensioned by the spring —3— to shear closely against the upper face of the lower blade and that the spring —3— is secured to the brace —7— in such manner as to cause the blades to exert more or less downward pressure upon the seat —11—, thereby assisting in keeping the cutting edges of the blades in shearing contact.

The main body of the guide shoe or runner —6— is disposed in a substantially horizontal plane when in operation approximately the same length as the handles —2— or the distance between the rear ends of the blades —1— and the rear face of the bow spring —3— so that the forward end —11— of the guide will be directly under the rear ends of the cutting edges of the blades, thereby leaving practically the entire length of said blades free for cutting engagement with the grass, the greater portion of the runner between the end —11— and brace —7— being disposed a relatively short distance from the under side of the handles —2— so that it may ride along the edge of the sidewalk, curb, or other projections, to guide the shears in cutting the grass along said edge.

By making the guide shoe —6— relatively narrow transversely, it may serve as a guide to engage either edge of the sidewalk or curb when moved in the same direction or it may be moved along and against opposite edges of the walk when the device is moved in reverse directions with the assurance that the cutting edges of the blades will be in position to shear the grass along the edges of the walk or curb.

The hand levers —9— cross each other and are pivoted at their crossing by a bolt —12— to the upward and rearward extension, as —7'— of the brace —7—, some distance above the spring —3—. The lower or front ends of the levers —9— are secured by bolts —13— to the front ends of the handles —2— near their junctions with the blades —1—, so as to simultaneously move the blades in opposite directions as the levers —9— are rocked about the pivoted bolt —12—.

The rear ends of the hand levers —9— extend upwardly and rearwardly a considerable distance beyond the brace —7— and are provided with handles —14— within easy reaching distance of the operator, when standing, for rocking the levers and shearing blades connected thereto in reverse directions, it being understood that the spring —3— is tensioned to open the blades and incidentally open the handles —14—.

It is evident, however, that the opening action of the blades is not dependent upon the spring but may be opened and closed by the operation of the levers —9—.

In Figure 4, I have shown a portion of a sidewalk or curb —A— with the shoe —6— in position for engaging the edge thereof to guide the device in its forward movement, while the levers are being operated to trim the grass along said edge.

The upper inclined portion —10— at the front end of the shoe, as shown, permits cutting closely to the walk or ground, if desired, without interfering in any way with the free sliding movement of the shoe or runner along the ground, the horizontal portion of the runner being disposed substantially parallel with the blades a sufficient distance below the same to cut the grass as short as may be desired when resting flatwise upon the ground.

The upturned rear end of the shoe —6— overlaps upon the rear face of the lower end of the brace —7—, and is provided with a vertical elongated slot for receiving the bolts —8— and permitting the shoe to be adjusted vertically relatively to the brace and shears for gauging the height of cut of the grass, said bolts serving the double purpose of securing the brace to the bow spring —3— of the shears and also of holding the brace and shoe in their relative adjusted positions.

What I claim is:

1. A lawn edge trimmer comprising a forwardly and rearwardly extending guide shoe or runner, a brace extending upwardly from the rear end of the shoe, a grass shear secured at its rear end to the brace directly over the runner and having its blades extending forwardly beyond the front end of the runner, and a pair of crossing hand levers pivoted at their crossing to the upper end of the brace and extending forwardly and rearwardly therefrom, the front ends being attached to the opposite blades of the shears respectively.

2. A lawn edge trimmer comprising a forwardly and rearwardly extending guide shoe, having its front end deflected upwardly and forwardly, a brace extending upwardly from the rear end of the shoe, a grass shear mounted on the brace and having both its blades movable transversely of and above the front end of the shoe, and a pair of hand levers pivotally connected to the upper end of the brace and connected to the blades of the shears for operating said blades transversely of each other.

3. A lawn edge trimmer comprising a forwardly and rearwardly extending shoe, a brace rising from the rear end of the shoe, a grass shear secured to the brace and extending therefrom beyond the front edge of the shoe and having both of its blades overhanging the front end of said shoe, hand levers crossing each other and pivoted at their crossing to the upper end of the brace, said levers having their front ends attached to the opposite blades of the shears.

4. A lawn edge trimmer comprising a forwardly and rearwardly extending shoe having its front end inclined forwardly and upwardly and its rear end deflected upwardly from the brace, a grass shear secured to the brace and having one of its blades overhanging the front end of the shoe, said shoe being relatively narrow transversely and disposed in substantially the same vertical plane as the longitudinal center of the shears, a pair of hand levers crossing each other and pivoted at their crossing to the upper end of the brace and having their front ends attached to the opposite sides of the shears.

5. A lawn edge trimmer comprising a forwardly and rearwardly extending shoe having its front end inclined forwardly and upwardly and its rear end deflected upwardly to form a brace, a grass shear secured to the brace and having one of its blades overhanging the front end of the shoe, said shoe being relatively narrow transversely and disposed in substantially the same vertical plane as the longitudinal center of the shears' end, a pair of hand levers crossing each other and pivoted at their crossing to the upper end of the brace and having their front ends attached to the opposite sides of the shears and a flexible member connected to opposite sides of said shears to limit the opening movement of the blades.

6. A lawn edge trimmer comprising a pair of shearing blades united at their rear ends by a bow spring tensioned to open the blades, a brace secured to the bow spring and extending forwardly therefrom, a pair of hand levers crossing each other intermediate at their ends, and pivoted to said brace at their crossing, said levers having their front ends attached to their respective shear blades, and a guide shoe extending lengthwise of and beneath the shear blades, and adjustable vertically of and upon the brace.

7. A lawn edge trimmer, a pair of shearing blades, a bow spring connecting the blades and tensioned to open the same, a guide shoe extending lengthwise of and beneath said blades, and having its front and rear ends deflected upwardly, a brace overlapping upon the upturned rear end of the shoe, said brace and shoe being adjustable vertically relatively to each other, means for securing the brace and shoe in their relatively adjusted positions, a pair of hand levers crossing each other intermediate at their ends and pivoted at their crossing to said brace.

In witness whereof I have hereunto set my hand this 3d day of November 1920.

CLINTON W. GRIFFIN.

Witnesses:
H. E. CHASE,
MARJORIE L. QUINELL.